April 19, 1966 W. BRENNER ETAL 3,246,751
SORTING MEANS
Filed June 13, 1962 5 Sheets-Sheet 1
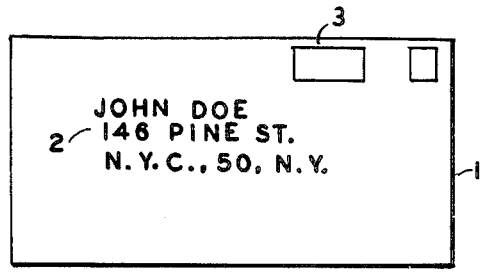
FIG 1
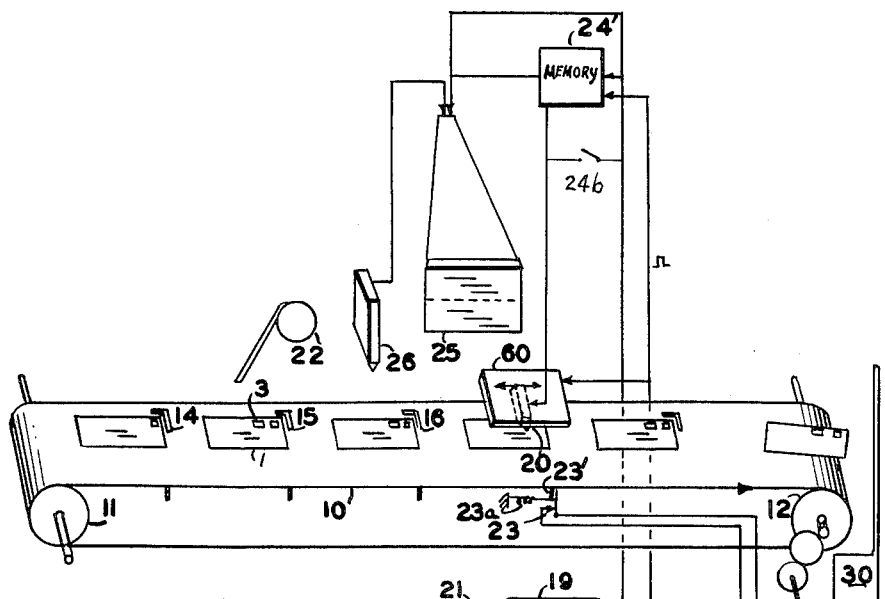
FIG 2
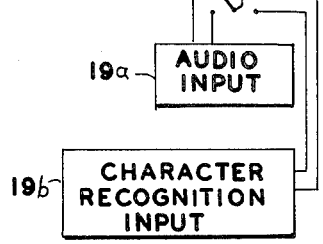
INVENTORS
WILLIAM BRENNER
BY SIDNEY KOSLOW
James P. Malone

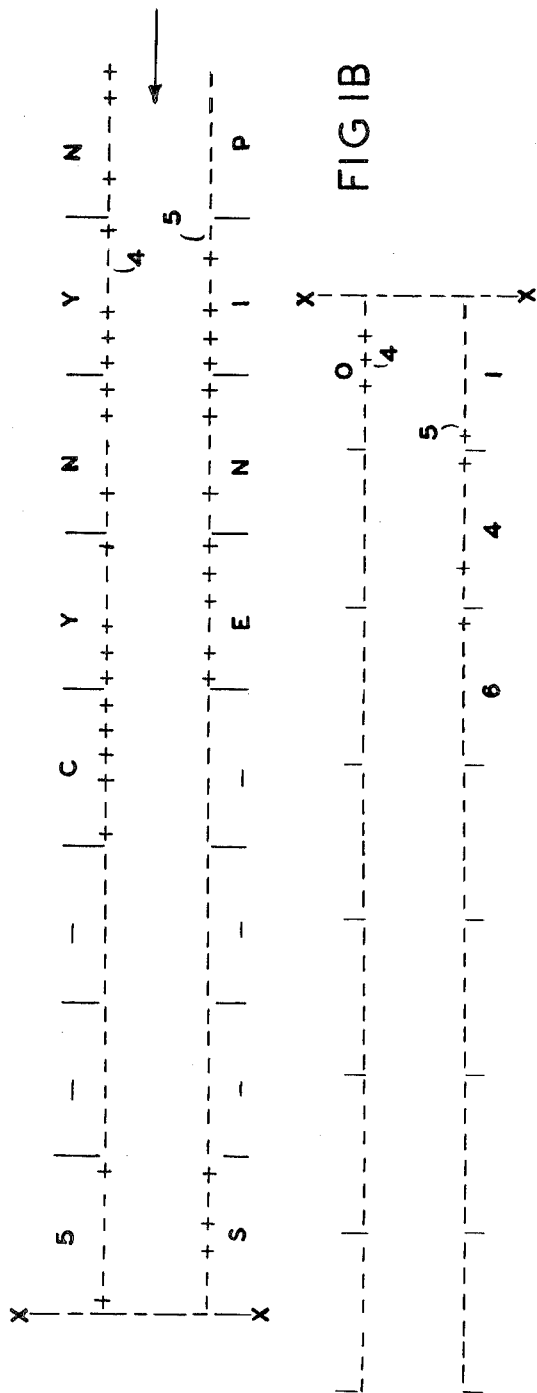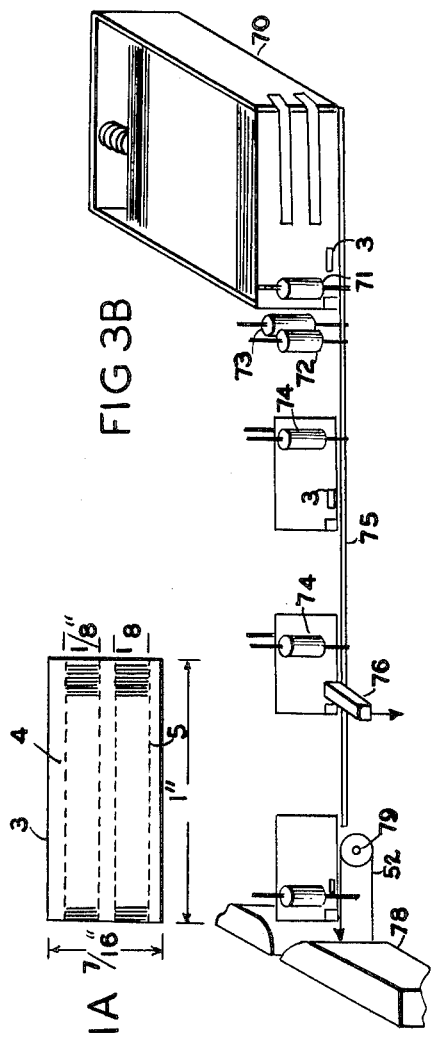

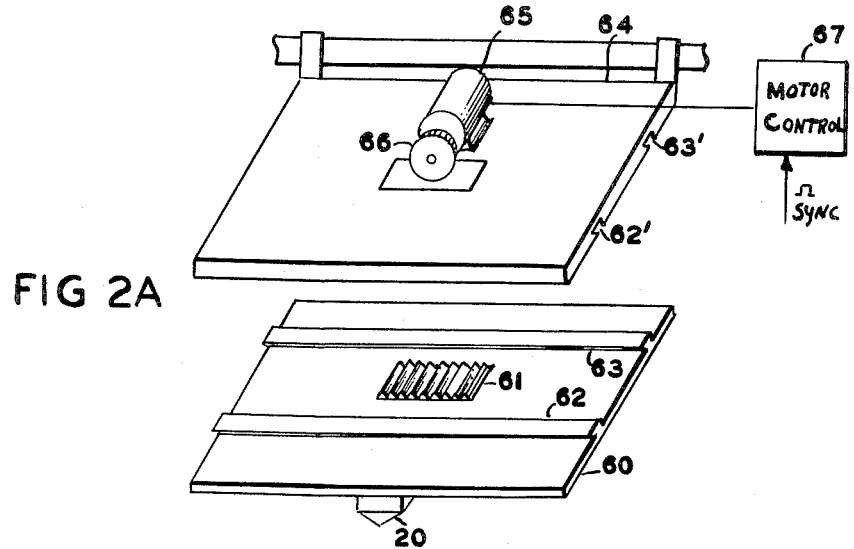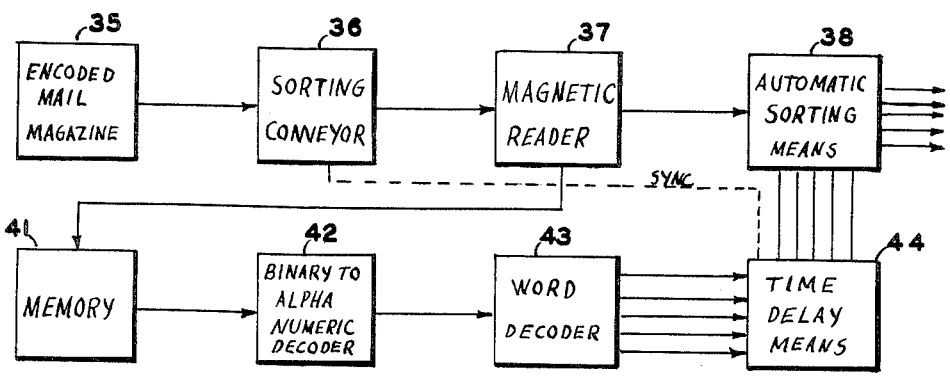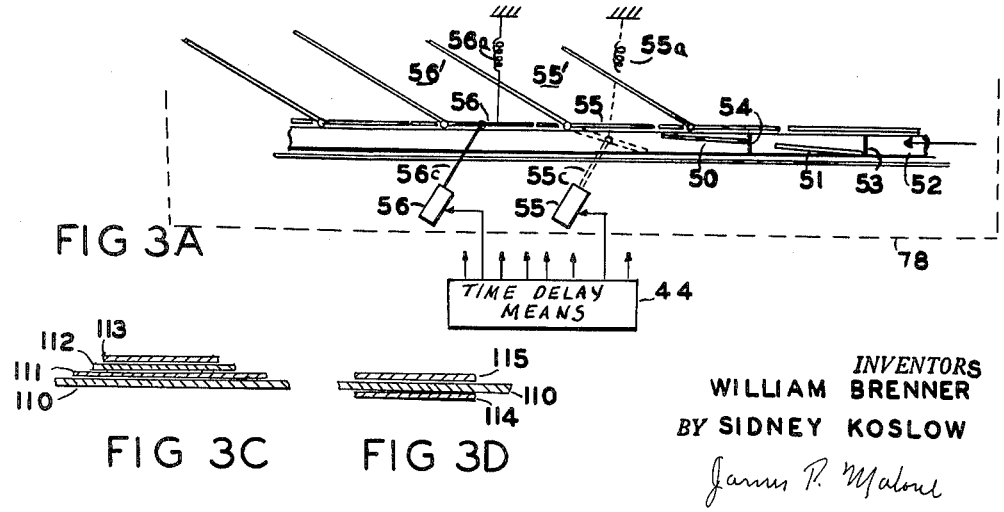

INVENTORS
WILLIAM BRENNER
SIDNEY KOSLOW
BY
*James P. Malone*

United States Patent Office 3,246,751
Patented Apr. 19, 1966

3,246,751
SORTING MEANS
William Brenner, 105 Neil Court, and Sidney Koslow, 111 Neil Court, both of Levittown, N.Y.
Filed June 13, 1962, Ser. No. 202,291
2 Claims. (Cl. 209—111.5)

This application is a continuation-in-part of our prior copending application S.N. 801,173, filed March 23, 1959, now Patent Number 3,040,323, for Magnetic Coding means.

This invention relates to means and methods for sorting mail or other articles and more particularly to such means using magnetic recording.

More particularly the invention relates to means and methods for applying magnetic material, for instance, tape, to a predetermined portion of the envelope, recording the address information on the magnetic material, and sorting the mail by magnetically reading the address information and applying said information to automatic sorting apparatus.

There is a great need for a system of the present type since the mail today is still being sorted by hand in the same manner as centuries ago. This problem has not been solved or improved to any significant degree from its original state, although virtually all other fields have been mechanized by automatic labor-saving devices.

This problem is accentuated by the fact that an average piece of mail is sorted about five or six times as follows:

(1) At the origination post office, local mail is sorted from non-local mail.

(2) At the origination general post office, the mail is again sorted.

(3) At the destination general post office, it is again sorted to local post offices or zones.

(4) At the destination local post office, it is again sorted by route.

(5) It is again sorted by the carrier to arrange the route.

Additional sortings are required to separate air mail, and possibly at intermediate general post offices.

The magnitude of the problem is shown by the fact that the United States Post Office has over half a million employees, the great majority of whom are employed in the tedious and monotonous hand sorting of mail.

The main difficulties in sorting mail are as follows: The addressing is done by the public with different handwritings, different fonts of type, different inks and pencils, different spacing between lines and letters, and different spacing on the face of the envelope so that direct reading of the address is not economically practical particularly for the multiple sorts involved. Also, the envelopes are of different sizes and shapes and made of different types of paper so that methods involving printing of codes on the envelopes with special inks are not practical due to the possibility of the ink running on certain types of paper.

The present invention solves all of these problems by placing magnetic material, for instance, tape or film, in a predetermined position on the envelope and recording the address information on the tape automatically or semi-automatically. Coding is done with a magnetic head connected to input means such as keyboard encoders, voice input or automatic coding means responsive to automatic reading character recognition means.

Sorting is fully automatic, the tape being read by a magnetic head and the information fed to fully automatic sorting apparatus.

Magnetic recording has great advantages over all other coding methods.

(1) All necessary information may be recorded on a piece of magnetic material such as tape approximately 1″ by 7/16″ which is approximately the area of a small postage stamp.

(1a) Errors made in the present system are easily corrected. Other systems involving printing are impractical to correct. Systems which require printing on the reverse side are not practical to correct, for instance, with postcards.

(2) The tape or other recording means may be easily erased if a mistake is made, or for forwarding mail.

(3) The tape or other recording means is not affected by the type texture or color of paper or by any designs or marking on the paper.

(4) The tape or other recording means is not limited to use on paper but may be used on wood, metal, plastic, or any other material.

(5) The tape or other recording means is not affected by being wet.

(6) The coding is simply done by operation of a simple typewriter keyboard by anyone who can type with little or no special training.

(7) The coding is only done once, no matter how many sortings are required.

(8) Checking of coding and remote operation with closed circuit television monitors are easily arranged.

(9) Each operator sets his own pace as the conveyor belt carrying the envelopes is synchronized by the coding apparatus.

(10) Large mailers may supply their own coded tapes automatically coded when addressed, thereby saving postal encoding time.

(11) Return envelopes can be precoded for address as well as department.

Accordingly, a principal object of the invention is to provide new and improved means and methods for sorting mail, articles or the equivalent.

Another object of the invention is to provide means and methods for encoding the maximum information on the smallest area on mail to be sorted.

Another object of the invention is to provide new and improved means and methods of sorting mail, articles or the equivalent by utilizing magnetic material placed on the envelope, or articles.

Another object of the invention is to provide new and improved means and methods for sorting mail, articles or the equivalent comprising placing magnetic material such as film or tape on the envelopes, magnetically recording, with audio, code, or character recognition inputs, the address information onto said material, and sorting said mail by placing the envelopes under a magnetic reading head, reading and decoding the information read, and feeding the information to mechanical sorting apparatus.

Another object of the invention is to provide means and methods for coding and sorting mail which is not dependent upon the type of paper or size of the envelopes.

Another object of the invention is to provide new and improved means and methods for coding and sorting mail or the like in which the coded information may be easily erased from the envelopes to correct errors, or change the information when necessary for forwarding mail, for change of address, or when entering a new country.

Another object of the invention is to provide new and improved means and methods for coding and sorting mail which is fully automatic.

Another object of the invention is to provide new and improved means and methods for sorting mail which is simple and permits training an operator with a minimum of effort.

Another object of the invention is to provide new and improved means and methods for sorting mail wherein the only skill required of the operator is the ability to read and to type on a simple keyboard.

Another object of the invention is to provide new and improved means and methods for coding mail from a remote location.

These and other objects of the invention will be apparent from the following specification and drawings, of which:

FIG. 1 is a front view of an envelope face showing the use of the invention.

FIGS. 1A and 1B are detail views illustrating one method of coding.

FIG. 2 is a schematic view of an embodiment of the coding means of the invention.

FIG. 2A is a detail view of the magnetic head mounting.

FIG. 3 is a block diagram of the automatic sorting process.

FIGS. 3A and 3B are detail views of the automatic sorting means.

FIGS. 3C and 3D are detail views of the shielding.

Figure 4:
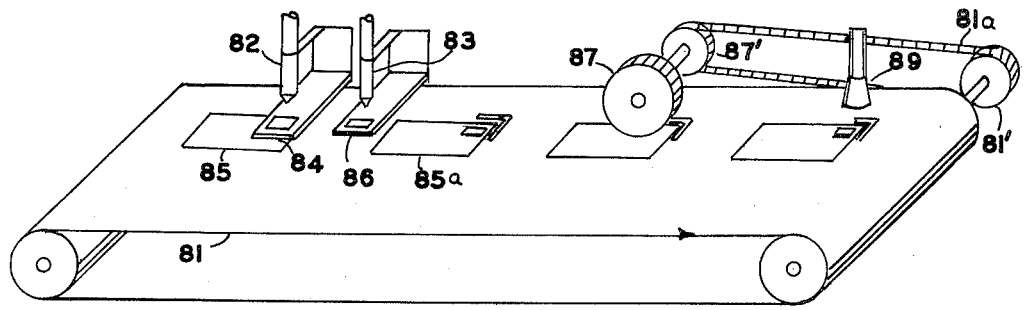
FIG. 4 is a perspective view of a modification of the invention.

FIG. 1 shows a typical envelope or article label 1 having an area 2 for name and address. The magnetic material and film tape 3 of the present invention which is about 7/16" by 1" is placed on a predetermined portion of the envelope preferably close to two sides so that the spacing can be easily controlled.

If desired the envelope may be coated or made of a magnetically impregnated material. The contents of the envelope is normally isolated magnetically from the strip by the envelope material. Greater shielding may be provided by adding a layer of non-magnetic material under the magnetic material or by placing another magnetic strip under the coded strip and isolated from the coded strip. This can be done by placing a non-magnetic material between two layers of magnetic material on the surface of the envelope or placing one strip of magnetic material on either side of the envelope using the envelope material as the non-magnetic spacer.

FIG. 1A illustrates a pair of magnetic tracks 4 and 5 illustrating typical spacing of the information. The information may be binary in form consisting of plus and minus magnetic recordings of plus and minus pulses. The information is fed from a keyboard or a memory or other input means such as audio or character recognition means to a magnetic head which scans the piece of tape by moving the head, the envelope, or both. A preferable mode of operation is serial coding and is not affected by slight misregistration of the envelope providing the magnetic area 3 is scanned by the recording head. The registration tolerance can be increased by increasing the track widths and the magnetic area. Typical dimensions are shown.

FIG. 2 shows a coding arrangement comprising a conveyor belt 10 mounted on the rollers 11 and 12 which are connected to be driven by the motor 13. The conveyor belt contains a series of raised corner pieces or clips 14, 15, 16, and so forth, which are used to locate the envelopes so that the magnetic tapes will pass operatively through the magnetic field of the magnetic head 20 which may be mounted above the conveyor belt. Since in this application it is desirable that the head scan the tape it may be preferable to stop the conveyor belt and have the head 20 movably mounted for the necessary scanning. Only a very small movement is required and the head may be mounted on a simple mechanical rack as shown in FIG. 2A, or the head may be stationary and the envelope moved past it in operative contact relationship.

FIG. 1B illustrates one method of coding. A six space binary code is used to provide sixty-four combinations for the alphabet, numbers 0 to 9, plus any special instructions. The illustrative address is spelled adjacent the corresponding binary symbols. An area of 1 inch by 7/17 of an inch is sufficient. In the figure the tracks is broken by line X—X.

The information may be recorded on the tape preferably in binary form by means of coding means 19 having a standard keyboard 21. Coding apparatus of this type is conventional, being used to insert information into conventional computers, with and without memory means, as shown on page 54 of "Review of Input and Output Equipment Used in Computer Systems," published March 1953, by American Institute of Electrical Engineers. See also, High Speed Computing Devices, Engineering Research Association, McGraw-Hill, page 43. A typical machine is the Flexowriter manufactured by Commercial Controls, Inc., Rochester, New York, and also shown in Patent No. 2,905,298. This machine has a standard keyboard which controls various switches in combinations which change the letters and numbers on the keyboard to binary type information, namely, various combinations of plus pulses and minus pulses. Equivalent means are described in Bryant Computer Products Division's paper "Introduction to Pulse Magnetic Recording," by Frank J. Lohan. Other equivalent information input or coding means may be used, for instance, audio coding or character recognition equipment may be used. Equipments which are responsive to audio input information and which will transform this information to discrete signals suitable to feed modern computers (including magnetic tape input) are described on pages 214 to 218 of the Proceedings of the Eastern Joint AIEE–IRE–ACM Computer Conference, December 1957, Washington, D.C., also on pages 294 to 309 in the IBM Journal of Research and Development, vol. 2, No. 4, October 1958, and pages 41 to 47 of Automatic Control Magazine, January 1960, and references cited therein.

Character recognition equipment which will perform in a comparable manner is described in (Sprick) U.S. Patent No. 2,838,602, also on pages 129 to 133 in Electrical Manufacturing, June 1960, also on pages 238 to 242 of the Proceedings of the Eastern Joint AIEE–IRE–ACM Computer Conference, December 1957, Washington, D.C. These equipments can be connected to operate a matrix similar to that in the Flexowriter described above or they may feed the magnetic writing heads directly. When this class of equipment is brought down in price it may be economically sound to use them to replace the first reading of the address which is done by a person in one embodiment of this invention. This type of equipment will however always be more expensive for the reading process than the simpler magnetic reading equipment.

A preferred mode of operation is to read the address at the first reading with character recognition equipment and convert and encode the letter magnetically so that the letter can be read and sorted the remaining number of times required on simpler less expensive magnetic reading equipment. The above apparatus may be substituted for the keyboard Flexowriter shown.

The letters are placed on the conveyor belt with the stamped corner placed against the corner members 14, 15, and so forth on the conveyor. The letters may be placed by hand, or equivalent mechanical means may be utilized. A small piece of magnetic material or tape is then affixed to the envelope from the roll 22, with a predetermined spacing from the edges of the envelope in the corner holders 14, 15, and so forth. The pieces of tape may be placed by hand or preferably by automatic conventional apparatus as manufactured by Minnesota Mining & Mfg. Co.

Alternatively a strip film of magnetic material may be rolled, printed or sprayed on the envelope, or the paper of the envelope or label may be impregnated with magnetic material. The magnetic material may be present from a previous operation or manufactured as such.

The conveyor belt may be arranged and controlled to automatically stop with the tape underneath the recording head 20 by means of automatic control switch means 23 connected to the motor and operated by finger 23' on belt 10. Switch 23 is adapted to be by-passed by switch 24 in response to a release key after the information is applied to the keyboard 21. Alternatively, the head may be stationary and the envelope scanned by moving it past the head.

The information may be recorded in the following sequence:

(1) Type all information into memory 24'.
(2) Press release key whereby:
Head 20 scans,
Memory empties to recording head 20, and
Belt 10 moves to next position after time delay.

Memory 24' preferably holds one or more addresses so that the head scanning can take place on one letter while typing the following letter address. The memory may be a conventional magnetic drum or register device. As the envelopes are advanced, they will ride off the end of the conveyor belt over the corner spacers into a magazine 30, or directly to a sorting means as shown in FIGS. 3A and 3B. If desired the memory may be dispensed with and the information fed directly to the recording head. In this case the input means must be synchronized with the recording head.

A suggested improvement is to have a closed circuit television display 25 connected to the encoder 19 which displays the typed information as it is inserted in the keyboard 21. This will provide a check for the operator. Another suggested improvement is to incorporate a video camera 26 mounted above the conveyor belt and connected to a split video display on tube 25. This would provide the picture of the address on the envelope which would then be compared directly with the picture of the typed information to be recorded on the tape. With this arrangement the operator would not have to look at the envelope but only at the video display tube 25. Therefore, the operator could be remote from the conveyor belt, even in a different building or in a different part of the city. This arrangement would provide great flexibility, for instance, operators at a central location could encode mail at various other stations in the city and could switch from one post office station to another depending upon the various loads of mail in the different stations.

Switch 23 is normally closed by spring 23a and switch 24 is normally opened by spring 24a. When the release or sync key is pushed, switch 24 is momentarily closed by a pulse P from time delay 9 through coil 24b to start belt moving again to new position.

Error detection may be effected by counting the total number of pulses per track, at the encoding or reading stations.

FIG. 1A shows a detail of the magnetic tape to be affixed to the envelope. Suggested dimensions are preferably 1" x 7/16" and the information is preferably serially recorded along two linear magnetic tracks 4 and 5 which are each approximately 1/8" wide. The magnetic impressions are represented by lines on the tracks 4 and 5 in FIG. 1A. The magnetic impressions are produced by plus or minus pulses.

FIG. 1B shows a typical method of coding with the plus and minus pulses illustrating the coding for the address given in FIG. 1, namely, 146 Pine Street, N.Y.C. 50, N.Y. For instance, the upper track 4 would first receive the N.Y. State information and then the N.Y. City information. This is followed by two blank spaces to accommodate locations requiring more letters and is then followed by the zone 50 designation. The other track 5 shows typical coding for Pine plus three blank spaces for streets requiring more letters, followed by the symbol S for street and the numbers 146. Additional spaces on either track may be used for additional coding information, for instance, for foreign or air mail or any other pertinent information. The code illustrated is a six element code which provides 64 different combinations for the alphabet and numbers plus additional combinations for other purposes. A piece of tape of the size shown, namely, 1" in length, will accommodate spaces for at least 15 letters or symbols in each track as illustrated in FIG. 1B, for a minimum of 30 letters.

FIG. 2A illustrates one method of scanning the magnetic coder 20. In this method the magnetic head 20 is mounted on a movable plate 60 which has a rack 61 and a pair of sliding bars 62 and 63 which are adapted to fit in the slots 62' and 63' of the upper plate 64 which is fixedly mounted on a suitable frame. The motor 65 is mounted on the fixed plate 64 and has an output drive gear 66 which is adapted to move the rack 61 and, therefore, scan and return the head 20 in response to motor control 67 which is triggered by a sync pulse from encoder 19.

*Coding operation*

A piece of magnetic tape about 1" by 7/16" is placed with adhesive on the envelope in a predetermined position, preferably by machine.

The tape on the envelope is then placed under a magnetic recording head. The head may be a conventional recording head of the type used in recording on magnetic tape. In the present application it is preferable to use a double or multiple head for making several separate magnetic tracks, with corresponding memory means.

The address on the envelope is read visually, and the operator operates a standard typewriter keyboard on a conventional coding machine. Equivalent conventional input means may be used. The purpose of the coding machine is to translate the visual symbols of the address into information that may be easily handled with standard computer techniques. The information is preferably converted into a binary form which is a code consisting of only two types of characters, for instance + or −. The encoder may be a conventional machine of the type used in coding and feeding binary information to conventional computers. This type machine has a standard typewriter keyboard and each key operates a switch which energizes a matrix. For instance, when key A is punched, the output may be +++−−− where + represents positive electrical pulses and − represents negative electrical pulses or the absence of pulses. The different letters and numbers have different combinations. The use of binary information is a well-known computer technique.

After the operator has inserted the information on the memory 24', he presses a release key and the head is scanned or moved relative to the tape by a simple mechanical arrangement, for instance, a rack, the movement of which is synchronized with the memory. The operator may then press another key connected to relay 24' to move the belt, or it may preferably be done with the release key through a time delay 9 sufficient for the recording. A typical address has a street number and name, city, possibly a zone number, and state information. Each bit of information has its own field on the tape.

Direct audio input means 19a or character recognition reading input means 19b may be connected by switch 19c. Memory 24' may be bypassed by switch 24a.

The tape 3 itself may be conventional magnetic tape of the type used in magnetic recorders and dictating machines with the addition of an adhesive to affix it to the envelope. The adhesive is preferably of the pressure sensitive type.

Alternatively, a magnetic film may be rolled, sprayed, or printed on the envelope or a magnetic film or tape may be incorporated in the postage stamp. The main difficulty in using the magnetic postage stamps is that their location on the envelope is not under the direct control of the Post Office. Magnetic shielding may be placed under the tape or film or on the interior of the envelope. This would eliminate any possible interference with magnetic contents in the envelope such as checks printed with magnetic ink.

FIGURE 3 shows a block diagram of the automatic sorting apparatus comprising an input magazine 35, a conveyor 36, magnetic reading head 37, and automatic sorting apparatus 38. Information from the reading head 37 is fed to a memory means 41, then to a binary to alpha-numeric decoder 42, and word decoder 43, then to a time delay means 44, the output of which would be connected to the sorting gates, FIG. 3A. Separate boxes 42 and 43 are shown for the decoders to better explain the retrieval of information. Actually this entire operation could be shown in one block. This system provides a series of sorting gates spaced along the conveyor belt. Since the different gates necessarily would require different times for a particular envelope to reach them, a different time delay would be required to operate each gate.

Memory 41 may be a conventional magnetic drum as manufactured by Laboratory for Electronics, Boston, Mass. or Bryant Computer Products, Springfield, Vermont or other conventional register means. Memory 41 may be bypassed by switch 41a if desired.

More specifically, the mail to be sorted is fed on a belt as described in connection with FIG. 2 or 3B under a conventional magnetic reading head 37. The envelopes must be located on the belt, as in FIG. 2 or 3B, with sufficient registration so that the pieces of tape will pass in operative proximity to the magnetic reading head. This may be done by clipping the envelopes in corner brackets on a horizontal belt or by holding the envelopes vertically by means of clips or rollers. As the tape of a paritcular envelope passes or is otherwise scanned by the reading head, the binary information is read, decoded, and fed to automatic sorting apparatus.

Serial coding makes lateral registration and skewing less critical. Longitudinal registration is not critical at all. The sorting apparatus may comprise a series of pivotally mounted gates which are selectively opened to guide the letters into particular slots. Alternatively, air jet diverters may be used. Due to the fact that it takes the envelopes a definite time to travel from the reading head to the particular slot or gate, time delay 44 must be utilized between the reading and the mechanical operation of the particular gate.

The decoding apparatus directly connected to the reading head 37 preferably comprises a memory 41, which may be a magnetic drum or register, a binary to alphanumeric decoder 42 similar to the conventional teletypewriter or Flexowriter except that instead of actuating typewriter keys the information will be utilized by a word decoder 43 to actuate the sorting apparatus. For instance, to separate New York mail from all other mail, the N.Y. binary information which may be ++ — — + —, + — — +++, would have to be collated to actuate the N.Y. gate. Time delay 44 may be a magnetic drum synchronized with the conveyor.

Specifically, the pulses and minuses which are read are preferably fed to a memory device 41 which may be a magnetic drum, then to a decoder 42 which is a conventional computer type having various circuit combinations of vacuum tubes to sort out the different combinations of symbols. For instance, assuming the letter X is represented by — — — — —, the first — would choose one of two circuits, the second — would choose one of two circuits connected to the first chosen circuit, the next symbol which is a — would choose one of two circuits connected to the second chosen circuit, and the fourth symbol which is a — would choose one of two circuits connected to the third chosen circuit, etc. At the termination of this combination of circuits would be a utilization device, for instance, a relay which would be responsive to the "N" and to no other combination. Other equivalent computer logic circuits may be used as well.

The "N" and "Y" pulses would go through the same type of selection. Decoder 42 may be a Uniprinter as manufactured by Remington Rand as described on page 59 of Review of Input and Output Equipment Used in Computers, published by American Institute of Electrical Engineers.

The combination of the "N" and "Y" information would be selected in the word decoder 43 in similar manner to actuate the N.Y. gate to receive the N.Y. mail. Due to the fact that there is a definite travel time for the envelopes between the reader and the N.Y. or other gate, it is necessary to insert a time delay 44 equal to the belt travel time.

Word or letter combination decoder 43 may be a series of conventional circuits arranged to give single outputs to different combinations of input circuits as described above or it may comprise conventional type coincidence or comparison circuits generally used in computer operations.

In the usual situation where the mail is being sorted into many categories, each distination gate would have to have a different time delay since the gates would have to be spaced along the conveyor belt at different distances from the reading head.

FIG. 3A shows a detail of typical sorting apparatus. The letters 50 and 51 ride on a belt 52 which is compartmented by vertical members 53 and 54. The letters are preferably carried between fairly narrow walls so that they remain substantially upright. The walls comprise a series of pivotally mounted gates 55 and 56 each opening into a slot 55' and 56' for the different locations, for instance, N.Y., N.J. The gates are normally held closed by the springs 55a and 56a but are opened by means of the corresponding relays 55b and 56b and linkages 55c and 56c which are operated from the delay means 44 of FIG. 3.

More specifically as shown in FIG. 3B, the mail to be sorted may be fed from a spring loaded magazine 70 or directly from the coding apparatus in vertical position by means of rollers 71, 72, 73, 74, and so forth. The mail is preferably inverted so that the tape 3 rides a predetermined distance from the table 75 past the reading head 76, and then onto a conveyor belt 77 into the automatic sorting apparatus 78. The conveyor belt drive shaft 79 is synchronized with the time delay apparatus 44. The types of articles that may be coded, sorted, or controlled by the present invention is unlimited ranging from letters or smaller articles to railroad cars or larger articles.

FIGS. 3C and 3D show means for shielding the envelope, for instance, from magnetic contents in the envelope.

In FIG. 3C the envelope 110 is shielded by placing a magnetic layer 111, then a non-magnetic layer 112, and then a second magnetic layer 113, which is adapted to be magnetized with the information. The layer 111 will therefore shield the information on layer 113 from any magnetic interference inside the envelope.

FIG. 3D shows another method of shielding the envelope 111 by placing a magnetic layer 114 inside the envelope and the usual magnetic layer 115 on the outside for receiving the information.

Another application of the invention is the field of railroad tickets. To illustrate this application let us describe a typical commuter system. A passenger would purchase a ticket which would have a magnetic strip on it. The ticket agent would place the ticket in an encoding machine having a recording head as in FIGS. 1 and 14 and with a keyboard or equivalent device encode the ticket magnetically. This ticket would then be inserted by the purchaser in a reading device at the turnstile when entering the railroad system. Different types of tickets would have different classifications. (e.g. monthly commutation would be type A, weekly commutation would be type B, a ten trip ticket would be type C, etc.). When the ticket is presented to the reading head located at the entrance turnstile, the information which is magnetically encoded on the ticket is fed into a pre-programmed computer. With the information fed into the computer, the computer will determine whether the ticket is valid for a ride at that time and if all conditions are satisfied will generate a signal to open the turnstile and permit the ticket holder to pass through. The computer will also change the information on the ticket where applicable, e.g. when a ten trip ticket is used for the first time an indication will appear on the ticket to show one trip used and that nine remain. Likewise the computer will not pass tickets on weekends which are valid only for rides during weekdays.

To insure against riders traveling beyond the station for which their ticket was purchased, the ticket will have to be presented to an exit turnstile to permit the passenger to leave the railroad system. The same computer can serve this purpose with proper programming. The computer will generate a signal to release the exit turnstile only when the ticket inserted was valid for that station or a more distant station. In other words the system would permit the passenger to exit at any station beween his entrance station and the station his ticket was validated for. Another feature added to prevent a ticket from being used by more than one passenger where one passenger follows another is to program the computer to acknowledge transactions in the following sequence. First an entrance transaction must take place. This must be followed by an exit transaction before the computer will acknowledge another entrance transaction.

Figure 14:
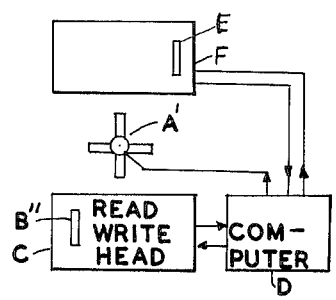
FIG. 14 is a schematic diagram of an application of the invention.

FIG. 14 illustrates the railroad application. A' is a turnstile at the entrance and exit of the system. B" is a slot designed to receive the coded railroad ticket B'. Means C to scan the ticket are similar to that shown earlier in the description. The computer D is located at some suitable location to control the operation and is preferably made to control many turnstiles, with a solenoid or similar control to release the turnstile under the right set of conditions. E is the exit slot in reader F which will operate as described above.

In some applications where high densities are not required like the railroad ticket it is not necessary to scan the heads as sufficient information can be coded while the ticket and heads are stationary. This is achieved by placing a number of heads in position to operatively magnetize the magnetic material at the desired location.

The following is a description of an alternate method of coding and sorting mail or articles. This method employs the use of thermoplastic recording techniques similar to those described in the Journal of Applied Physics, vol. 30, No. 12 P 1870, December 1959, and the Journal of the Optical Society of America, vol. 48, No. 11, page 841, November 1958. Several changes are required to apply this technique to this type of application. This method has several basic advantages. It is eraseable, and can be read without physical contact. Information can be placed on letters in very small space, and recorded information will not be affected by becoming wet.

Figures 5, 6:
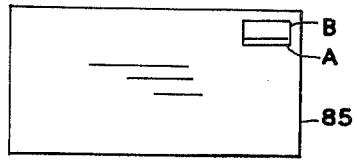
FIGS. 5 and 6 are plan and side views of the thermoplastic strip of the embodiment of FIG. 4.

Referring to FIG. 4 a conveyor 81 carries the letters in a manner previously described herein and in our aforementioned copending patent application No. 801,173. Letters 85, 85a, etc. are placed on conveyor 81 and oriented by the corner holders as in the previous description. First one layer A of conductive material is placed on the envelope. The layer A of conductive material is sprayed with nozzle 82 on the letter through a mask 84 which limits its boundaries. Subsequently a second layer B of non-conductive thermoplastic material is sprayed on with nozzle 83 through mask 86. The masks are so arranged to give two layers as shown in FIGS. 5 and 6. FIG. 6 is greatly enlarged in thickness. The lower layer A is larger than the top layer B to permit electrical contact with both layers during the encoding operation. These materials could be applied by different means such as two overlapping tapes held with pressure sensitive adhesive, or by rolling or printing.

Following this operation, the letter moves to a writing means. We show a writing wheel 87. The writing wheel is a means to selectively place electrostatic charges on the two layer strip of material for subsequent forming of the thermoplastic material.

Figures 7, 8:
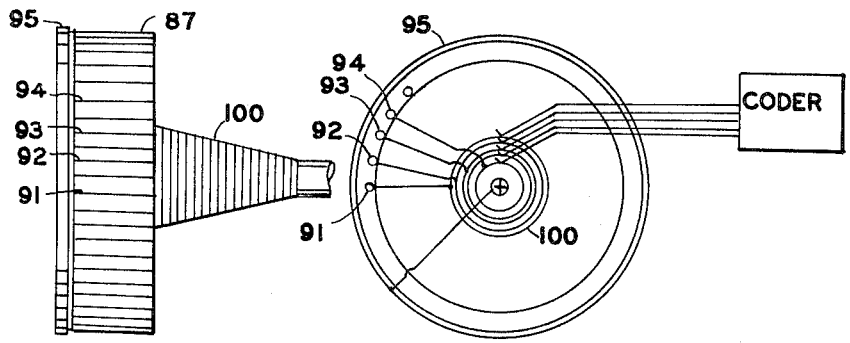
FIGS. 7 and 8 are front and side views of the electrostatic wheel of the embodiment of FIG. 4.

FIGS. 7 and 8 show details of the writing wheel 87. The wheel is constructed in two sections insulated from one another. One part 95 is a conductive wheel running the full circumference and arranged to contact the lower layer A of the strip on the envelope. The other part of the wheel is made of insulating material with individual wires, 91, 92, 93, 94, etc. which are conductors but which are insulated from each other. Contact with the wires can be made directly or through an arrangement of slip rings 100 as shown in FIG. 7. As the letter passes under the writing wheel the encoder device will place an appropriate charge on the wire in contact with the strip thereby leaving a charge as required to record the information. The letter may pass under the wheel as the wheel rolls over the letter, or the wheel may roll and translate over a stationary letter.

Figure 9:
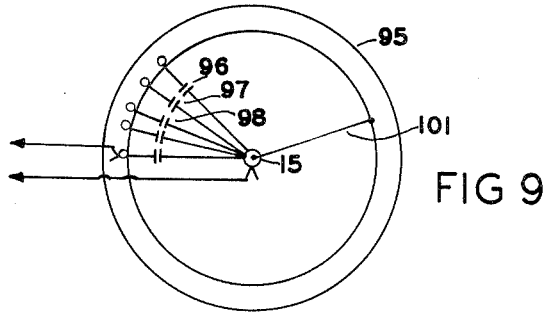
FIG. 9 is a schematic view of the modified electrostatic wheel.

If it is desired to store the information in the wheel for some time prior to writing the information on the letter the wheel may be designed as in FIG. 9. In this configuration capacitances 96, 97, 98 etc. are added between the wires and common 15 which is connected to part 95 by wire 101. This will permit charging the wheel and writing the information subsequently. The charging of the wheel must be synchronized with the encoding device during the charging operation. The position of the writing wheel recording head is synchronized with the position of the letter as previously described, or by other conventional means, for instance by gear 87' connected to wheel 87 and gear 81' connected to conveyor 81, the gears being connected by chain 81a. The wheel has a set of wires for each letter, which are encoded by the operator in synchronized relation. For instance as a first letter is being recorded by the wheel, the operator puts in the coding for the next letter.

Figure 11:
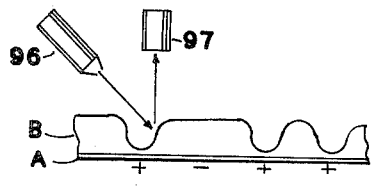
FIGS. 11 and 12 are diagrams illustrative of the method of reading of the embodiment of FIG. 4.

The coding operation will now be described. As the operator viewing the letter reads the address, he will operate a keyboard encoder or other input means as previously described. The encoded information is then fed to a memory and/or then to the writing wheel 87. The information could go directly to the writing wheel without the use of a separate memory. The information is in the form of electric pulses and can provide a binary type code with charges and the absence of a charge corresponding to the 1 and 0 of binary information, as shown in FIG. 11. The equipment is arranged so that the information is applied to the writing wheel serially, with subsequent charges or absence of charges appearing on subsequent wires. Parallel operation is also possible as shown later in this disclosure. The charge is applied to the letter by bringing the strip A, B in contact with the wheel so that the common contact 95 touches the lower layer A while the wires 91, 92, etc. contact the upper layer B, one following the other as the wheel rolls across the strip. The two layers form the plates of small condensers and as a result will hold a charge. Charges will be deposited where a charged wire comes into contact with the strip and will not appear where it is not contacted by a charged wire.

To develop the information the carrier with the charged strip of material is placed under a heater element 89 where the strip is heated. As the top layer material B on the strip or area which is thermoplastic becomes soft it will flow in a manner corresponding to the pattern of the charge. Ripples will be formed as described in the referenced articles. The ripples are formed by the interaction of the charges balanced by surface tension forces. Following this process the thermoplastic cools, at which time the ripples will set. The carrier is now ready for reading and sorting by automatic equipment.

Figure 10:
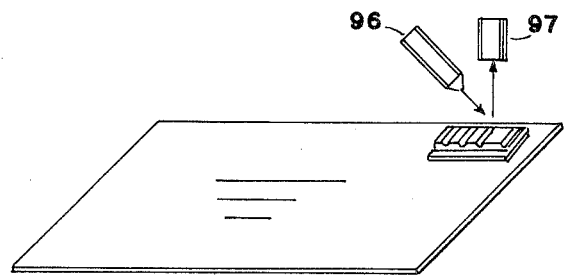
FIG. 10 is a schematic view of the reading means of the embodiment of FIG. 4.

The reading and sorting operation is accomplished as follows: The carrier will be passed by a reading head as previously described. The letter may be vertically or horizontally held. In place of the magnetic reading head, a light source 96 and a photoelectric pickup 97 are positioned as in FIGS. 10 and 11. The surface of the upper layer will be reflective and a pulse will be generated by the photocell every time a ripple passes the head.

Figure 12:
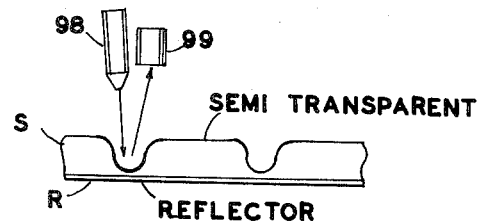
Figure 13:
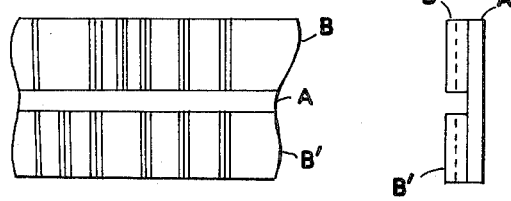
FIGS. 13 and 13A are plan and side views of a double track thermoplastic strip for the embodiment of FIG. 4.
Figure 13A:
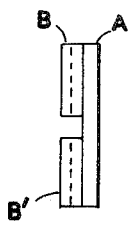

An alternate method shown in FIG. 12 would be to use a highly reflective material R for the base or conductive material and a semi-transparent material S for the upper layer. The light source 98 and pickup 99 are now arranged as in FIG. 12. With this arrangement the amount of light reflected will be a function of the thickness of the upper layer. By controlling the aforementioned properties we can have the photocell trigger pulses only when a valley of the ripple passes the reading head. Several ripple channels can be provided by using more than one track as B and B' in FIGS. 13, 13A. A separate sync pulse channel can be added in this manner. The remainder of the sorting means and operation is similar to that previously described.

Another embodiment of the invention will utilize an arrangement of materials similar to that described in the thermoplastic method but will depend on the retention of the electrostatic charge to detect the intelligence rather than the ripples in the thermoplastic material. The material for the upper layer would be selected for its dielectric properties and would not have to be thermoplastic. To encode the material the same equipment as previously described would be used. To read the electrostatic information directly would require a reading wheel similar to the writing wheel to detect the charges. This wheel would feed a high impedance amplifier which would sense the charges without bleeding off any appreciable amount of the charge thus permitting a number of subsequent reading operations. The high impedance amplifier would then feed the standard equipment previously described.

The magnetic and electrostatic charges may be erased by conventional methods.

Many modifications may be made by those who desire to practice the invention without departing from the scope thereof which is defined by the following claims.

We claim:
1. Means for sorting mail of varying size having a written address thereon comprising,
   electrostatically codable material placed on each piece of mail on an area spaced a predetermined amount from one edge of said mail piece and considerably smaller than said written address,
   conveyor means for placing said material on said mail under a reading head, and
   sorting apparatus connected to and responsive to said reading head to sort said mail.

2. Means for sorting articles of varying size comprising,
   electrostatically codable material placed on each article on an area spaced a predetermined amount from one edge of said articles,
   conveyor means for placing said material on said article under a reading head, and
   sorting apparatus connected to and responsive to said reading head to sort said articles.

References Cited by the Examiner
UNITED STATES PATENTS

| | | |
|---|---|---|
| 2,697,514 | 12/1954 | Stahl. |
| 2,950,005 | 8/1960 | MacDonald _____ 209—111.5 X |
| 2,994,428 | 8/1961 | Daubendick _____ 209—111.5 |
| 3,067,874 | 12/1962 | Rigg _____ 209—111.5 |

ROBERT B. REEVES, *Primary Examiner.*

ABRAHAM BERLIN, *Examiner.*